(12) United States Patent
Shuto et al.

(10) Patent No.: US 6,459,960 B1
(45) Date of Patent: Oct. 1, 2002

(54) DISTANCE RELAY EQUIPMENT

(75) Inventors: Itsuo Shuto; Yasuhiro Kurosawa; Hidenori Amou, all of Tokyo (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/379,922

(22) Filed: Aug. 24, 1999

(30) Foreign Application Priority Data

Oct. 14, 1998 (JP) .......................................... 10-291967

(51) Int. Cl.[7] .................... G05D 11/00; G05D 17/00; G05D 3/12; G05D 5/00; G05D 9/00
(52) U.S. Cl. .................. 700/293; 700/294; 324/521; 324/522; 361/80; 361/81
(58) Field of Search .......................... 700/293, 294; 361/76–80, 82, 84, 85; 324/521

(56) References Cited

U.S. PATENT DOCUMENTS

| | | | | |
|---|---|---|---|---|
| 4,357,666 A | * | 11/1982 | Matsushima et al. | 700/293 |
| 4,405,966 A | * | 9/1983 | Cavero | 361/80 |
| 4,433,353 A | * | 2/1984 | Wilkinson | 361/80 |
| 4,507,700 A | * | 3/1985 | Andow et al. | 361/80 |
| 4,577,254 A | | 3/1986 | Yamaura | 361/80 |
| 5,140,492 A | * | 8/1992 | Schweitzer, III | 361/80 |
| 6,046,895 A | * | 4/2000 | Jurisch et al. | 361/79 |

FOREIGN PATENT DOCUMENTS

JP          3-20969          3/1991

OTHER PUBLICATIONS

"Protective Relay Techniques, chapter 3", Tokyo Denki University Publications Office, (1981), pp 252–254.
Denki Kyodo Kenkyu, "Backup Protective Relay Systems", vol. 37, No. 1, (Electrical Joint Research), (1981), pp 41.
"Protective Relay Engineering" (1981), pp 119–127.
Yamaura MITSURU, Derwent Abstract of Japanese Reference No. 60–039312 (1985).

* cited by examiner

Primary Examiner—Thomas Black
Assistant Examiner—Crystal J Barnes
(74) Attorney, Agent, or Firm—Foley & Lardner

(57) ABSTRACT

A short-circuit distance relay has a short-circuit distance relay element that calculates a fault impedance from voltage and current which are introduced from a power system and that compares the fault impedance with a set impedance and uses the fault impedance comparison result within its protection zone. It calculates the amplitudes of the phase-to-phase differences of these voltage amplitudes and a sensitivity constant Vk.

11 Claims, 13 Drawing Sheets

FIG.4
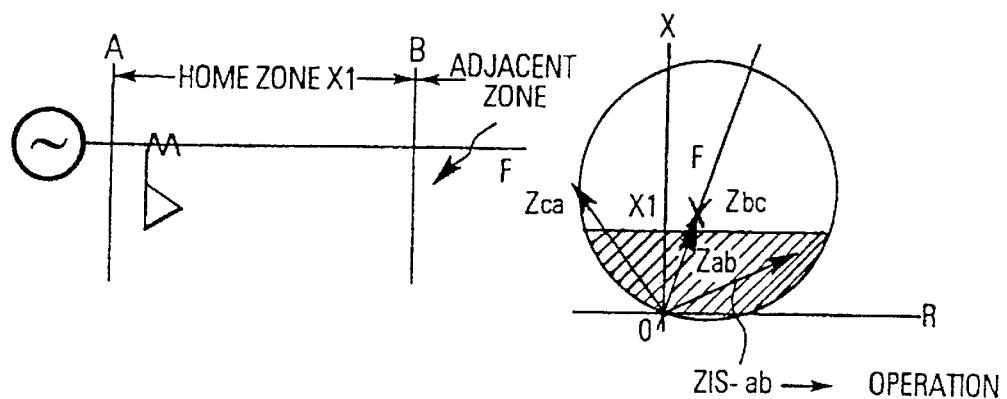
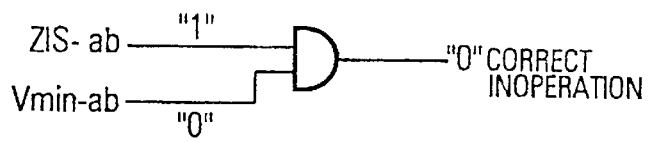
FIG.5
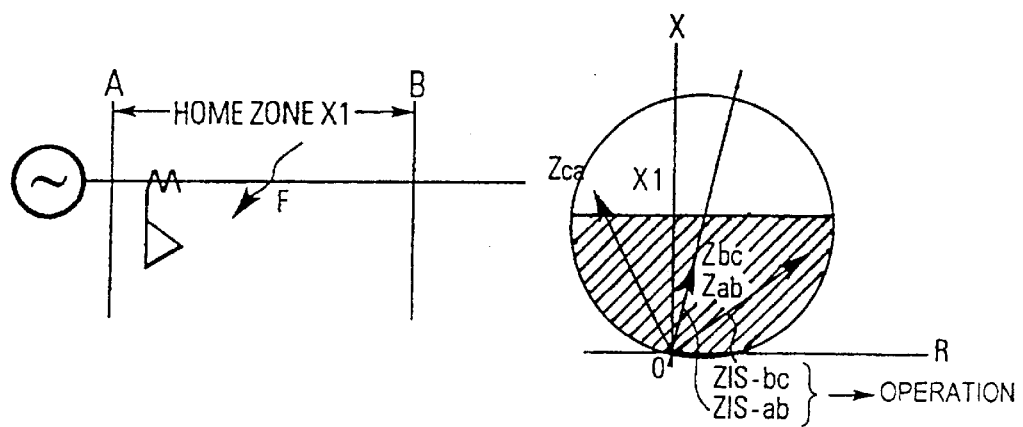
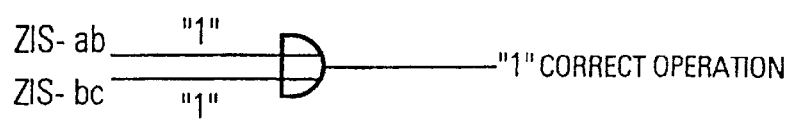

FIG.6
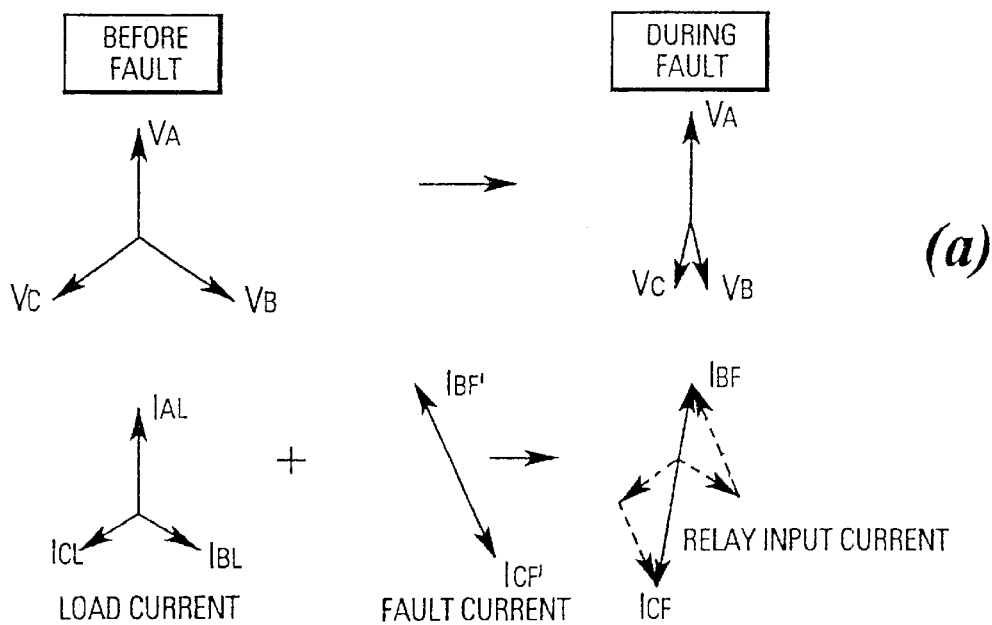
(a)
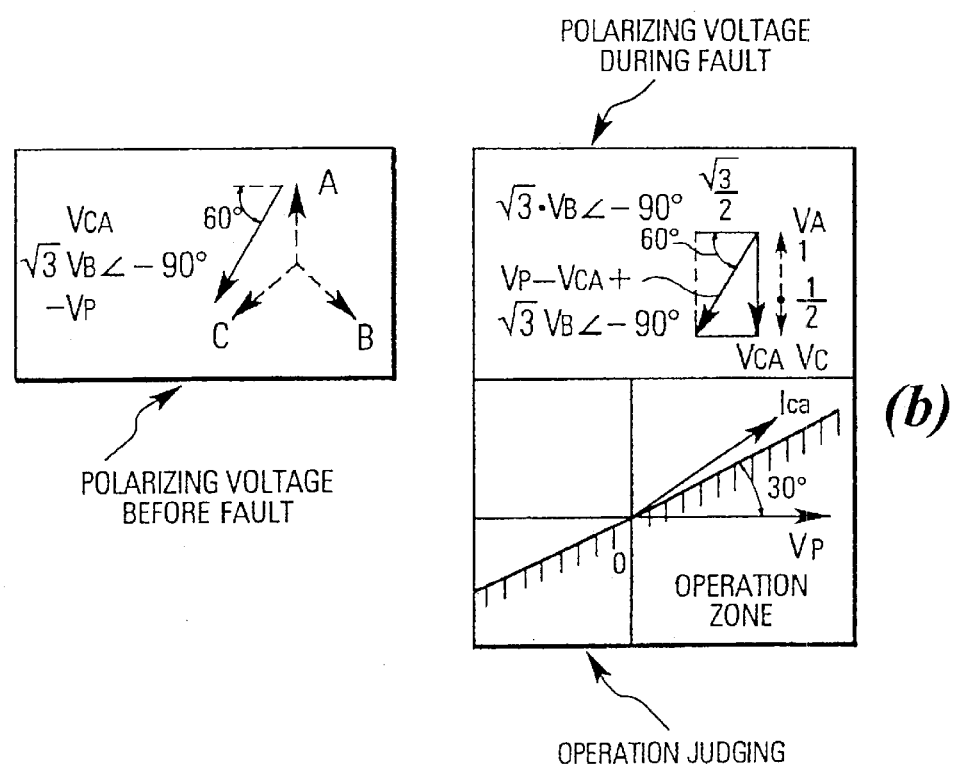
(b)

FIG. 7
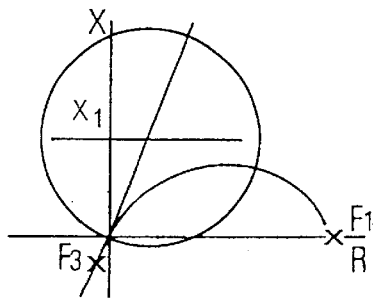
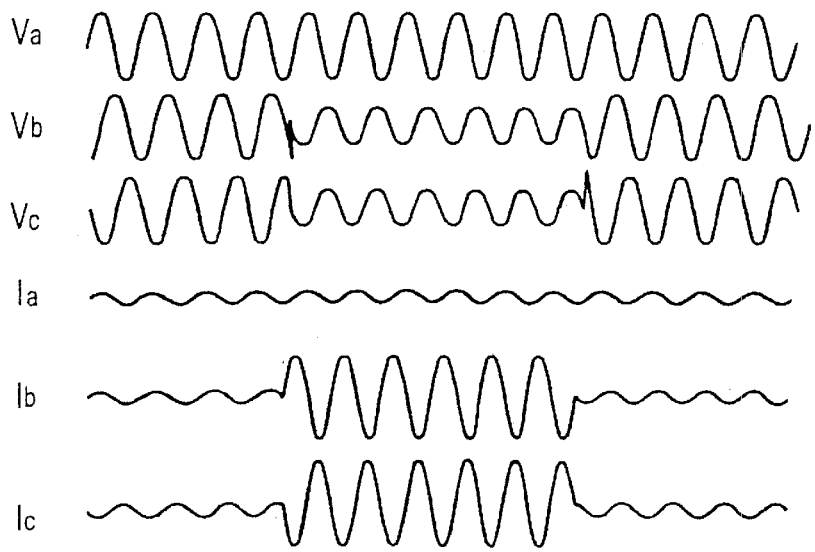
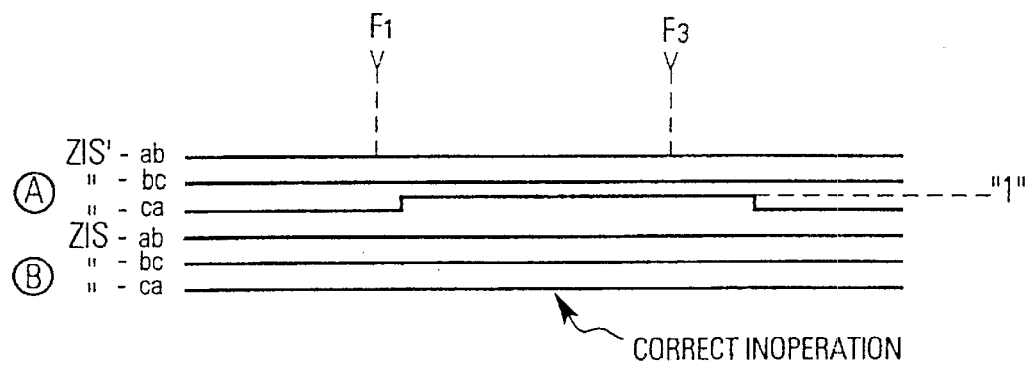
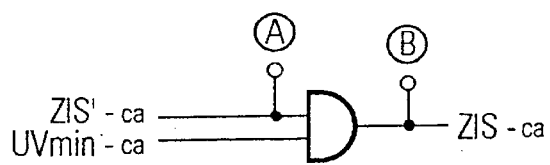

DISTANCE RELAY EQUIPMENT

FIELD OF THE INVENTION

The invention relates to a distance relay equipment that aims to prevent unwanted operation due to over-reach.

DESCRIPTION OF THE RELATED ART

In general, for the measured value of fault impedance in a distance relay, the impedance for the fault point is correctly found for the faulted phase, excluding the load current and fault point resistance etc.

However, as is well known, over-reach or under-reach of the set impedance occurs in respect of the other phases (phases associated with the faulted phase).

Here, "over-reach" means that the operating range of a distance relay reaches out of the distance which shows a limit of operation or the range of an impedance.

"Under-reach" means that a distance relay detects an internal fault in the operating range of the distance relay, excluding the output of operation.

A typical example of this tendency is the over-reach of the phase of lead in a short-circuit distance relay (ZIS) element described at p252–p254 of "Protective Relay Techniques, Chapter 3" published on Apr. 15, 1981 by Tokyo Denki University Publications Office.

Conventionally, as a countermeasure for such over-reach, as described in "Backup Protective Relay Systems" p.41, Volume 37, No. 1, published on Jun. 5, 1981 by Denki Kyodo Kenkyu (Electrical Joint Research), systems of preventing unwanted operation output of a ZIS element of phase of lead during occurrence of a fault, using the operating condition of an over current relay (OCR) shown in FIG. 15, or systems wherein the over-reach zone is restricted by a combination of blinder elements shown in FIG. 16 are widely employed.

In FIGS. 15(a), (b), the OCR combines with a first-stage X1 of a distance relay in ab-phase.

In FIG. 15(b), a circle shows characteristic of an mho relay element that finds a direction of fault, and X1 and X2 paralleling to an R axis shows reactance relay element that finds the distance where fault happens.

Here, in FIG. 15(b), X means "reactance", R means "resistance".

Therefore, the operation of over-reach of a distance relay in ab-phase is locked by in-operation of OCR in a phase when a fault happens in bc-phase.

In FIG. 16, the operation of over-reach of a distance relay in ab-phase is locked when Zab is in a blinder operation zone. In FIG. 16, X means "reactance", R means "resistance".

Here, "blinder elements" mean discriminating filter to protect the unwanted operation of the distance relay.

However, when the OCR operation condition is employed in combination with a ZIS element, there is the problem that the fault detection current sensitivity of the ZIS element depends on the magnitude of the load current.

Specifically, in the case of a heavy load system, it is necessary to raise the operation sensitivity of the OCR setting to a level such that this is normally not operated.

But, as a result, inevitably, the operation detection sensitivity of the ZIS element when a fault occurs is adversely affected. Namely, distinguishing the fault is adversely affected, making it difficult to distinguish the fault current and load.

Also, in the case of a countermeasure using the blinder element, the cooperation of the setting value such as to exclude the load impedance and setting with the object of preventing over-reach on fault occurrence can be difficult to operate, making it difficult to select an optimum setting value for use.

SUMMARY OF THE INVENTION

It is an object of the present invention to provide a distance relay of high reliability by adopting a principal that does not depend on the magnitude of the load current for preventing unwanted operation of a distance relay element due to over-reach.

It is a further object of the present invention to provide a distance relay wherein special consideration of setting in use is unnecessary, and wherein high reliability is provided, unaffected by system conditions.

These objects can be achieved according to this invention by providing, in first aspect, a distance relay equipment for detecting a protective region having a fault, among a protective zone that includes a plurality of protective regions, based on a status of a power system, comprising:

an operation decision unit having short-circuit fault distance relay elements that input respectively an electrical quantity from an AC power system of three phases a, b and c, the operation decision unit calculating a fault impedance from each of the electrical quantity to compare said fault impedance, which correspond to ab-phase, bc-phase and ca-phase, with a set impedance, to produce a judging signal of each ZIS element (ZIS element-ab, ZIS element-bc and ZIS element-ca), depending on said result of said comparison;

a calculating unit for calculating a phase-to-phase voltage amplitudes($|Vab|$, $|Vbc|$, $|Vca|$) in said ab-phase, bc-phase and ca-phase ;

a minimum phase voltage selection unit for selecting a minimum voltage phase ($V_A$min) for the phase-to-phase voltage amplitudes($|Vab|$, $|Vbc|$, $|Vca|$) determined by said calculating unit;

a fault phase element output unit for having an AND function, which is set to each of the phases (ab-phase, bc-phase, ca-phase) of said minimum voltage phase ($V_A$min) selected by said minimum phase voltage selection unit and said judging signal (ZIS element-ab, ZIS element-bc and ZIS element-ca), and outputs an operation signal, to separate, the protective region having the fault, from the protective zone, of said ZIS element-ab, said ZIS element-bc and said ZIS element-ca, if said AND condition is satisfied; and an operation output unit for judging whether or not two or more operated phases of the ZIS elements are present, to output an operation signal of said ZIS elements to separate the protective region having the fault from the other protective zones.

In second aspect, there is provided a distance relay equipment according to the first aspect, wherein said minimum phase voltage selection unit comprises:

a first unit for determining a first value equal to the absolute value of the difference between the absolute value of a first phase voltage and the absolute value of a second phase voltage;

a second unit for determining a second value equal to the absolute value of the difference between the absolute value of a first phase voltage and the absolute value of a third phase voltage;

a selection unit for selecting the first phase voltage if
  i) the first and second values are greater than a predetermined threshold,
  ii) the absolute value of the difference between the absolute value of the third phase voltage and the absolute value of the second phase voltage is less than the predetermined threshold, and
  iii) the difference between the absolute value of the third phase voltage and the absolute value of the first phase voltage is greater than the predetermined threshold;

the selection unit selecting the second phase voltage if
  i) the first value is greater than the predetermined threshold,
  ii) the second value is less than the predetermined threshold, and
  iii) the difference between the absolute value of the first phase voltage and the absolute value of the second phase voltage is greater than the predetermined threshold; and the selection unit selecting the second phase voltage if
  i) the first value is less than the predetermined threshold,
  ii) the second value is greater than the predetermined threshold, and
  iii) the difference between the absolute value of the first phase voltage and the absolute value of the third phase voltage is greater than the predetermined threshold.

In third aspect, there is provided a distance relay equipment according to the second aspect, further comprising:
  a third unit for selecting the minimum voltage phase among said first phase voltage, said second phase voltage and said third phase voltage if said selection unit does not select one of the phase voltages.

In fourth aspect, there is provided a distance relay equipment according to the second aspect, wherein said predetermined threshold is about 0.05 pu.

In fifth aspect, there is provided a distance relay equipment according to the first aspect, wherein said operation decision unit outputs a judging signal if the followings equations are satisfied:

$$(Iab-Vab\cdot\sin\theta)/I^2ab \geq Xs;$$

$$(Ibc-Vbc\cdot\sin\theta)/I^2bc \geq Xs;\text{ and}$$

$$(Ica-Vca\cdot\sin\theta)/I^2ca \geq Xs;$$

where Iab, Ibc and Ica are a phase-to-phase current;
where Vab, Vbc and Vca are a phase-to-phase voltage; and
where Xs is a setting impedance.

In sixth aspect, there is provided a distance relay equipment according to the first aspect, wherein said operation decision unit outputs a judging signal if the followings equations are satisfied;

$$Xs\cdot Iab-Vab\cdot Iab\cdot\sin\theta \geq 0;$$

$$Xs\cdot Ibc-Vbc\cdot Ibc\cdot\sin\theta \geq 0;\text{ and}$$

$$Xs\cdot Ica-Vca\cdot Ica\cdot\sin\theta \geq 0;$$

where Iab, Ibc and Ica are a phase-to-phase current;
where Vab, Vbc and Vca are a phase-to-phase voltage; and
where Xs is a setting impedance.

In seventh aspect, there is provided a distance relay for detecting a protective region having a fault, among a protective zone that includes a plurality of protective regions, based on status of a power system, comprising:
  an operation decision unit having ground fault distance relay elements that input respectively an electrical quantity from an AC power system of three phases a, b and c, calculating a fault impedance from each electrical quantity and compare said fault impedance with a set impedance and that, making a judging signal of each ZIG element (ZIG element-a, ZIG element-b and ZIG element-c), depending on said result of said comparison;
  a calculating unit having an under-voltage relay element, outputting a judging signal if an absolute value of each phase voltage ($|Va|$, $|Vb|$, $|Vc|$) is larger than a prefixed value;
  an output unit identifying whether or not said judging signal outputted from said calculating unit is present for two or more phases;
  a final output unit, if said judging signal is present for two or more phases in said output unit, performing an output of an operation signal, to separate a protective region having fault from the protective zone, of all of said judging signal of said operation decision unit to a non-operated side.

In eighth aspect, there is provided a distance relay equipment according to the seventh aspect, wherein said calculating unit includes an mho relay element.

In ninth aspect, there is provided a distance relay equipment according to the seventh aspect, wherein said calculating unit uses the following equations of said mho relay element:

$$Ms\cdot Ia\cdot Vpa\cdot\cos\theta - Vb^2 > 0;$$

$$Ms\cdot Ib\cdot Vpb\cdot\cos\theta - Vc^2 > 0;$$

$$Ms\cdot Ic\cdot Vpc\cdot\cos\theta - Va^2 > 0;$$

where Ms is a setting value of an mho element;
where Ia, Ib and Ic are a phase current; and
where Vp is a polarity voltage.

In tenth aspect, there is provided a distance relay equipment according to the ninth aspect, wherein said operation decision unit outputs a judging signal if the followings equations are satisfied:

$$(Ia\cdot Va\cdot\sin\theta)/I^2a \leq Xs;$$

$$(Ib\cdot Vb\cdot\sin\theta)/I^2b \geq Xs;\text{ and}$$

$$(Ic\cdot Vc\cdot\sin\theta)/I^2c \geq Xs;$$

where Ia, Ib and Ic are a phase current;
where Va, Vb and Vc are a phase voltage; and
where Xs is a setting impedance.

In eleventh aspect, there is provided a distance relay equipment according to the ninth aspect, wherein said operation decision unit outputs a judging signal if the followings equations are satisfied:

$$Xs\cdot Ia-Va\cdot Ia\cdot\sin\theta \geq 0;$$

$$Xs\cdot Ib-Vb\cdot Ib\cdot\sin\theta \geq 0;\text{ and}$$

$$Xs\cdot Ic-Vc\cdot Ic\cdot\sin\theta \geq 0;$$

where Ia, Ib and Ic are a phase current;

where Va, Vb and Vc are a phase voltage; and where Xs is a setting impedance.

Another invention consists of a digital distance relay having a first-stage immediate-operation zone short-circuit distance relay element that inputs respectively the voltage and current from an AC power system of three phases a, b and c, calculates a fault impedance from these voltages and currents and compares this with a set impedance and that, depending on the result of this comparison, makes an operation decision in the event of a fault within a transmission line protection zone, comprising: a first means for calculating the amplitudes |Vab|, |Vbc|, and |Vca| of the line-to-line voltages of the three phases; a second means for making a comparison decision of the absolute value ($|V_A|=||Vab|-|Vbc||$) (rotated in phase order for the other phases) of the phase-to-phase difference of said voltage amplitudes and a sensitivity constant Vk; a third means for making a comparison decision of the phase-to-phase difference ($V_A=|Vab|-|Vbc|$) (rotated in phase order for the other phases) of the voltage amplitudes and Vk; a fourth means that deems valid the operation output of the short-circuit distance relay element if the phase for which $|V_A|<Vk$ in said second means and said third means is untrue and $V_A>Vk$ is true, or the minimum phase selected by the third means is the same as the single-phase operation phase of the short-circuit distance relay element; and a fifth means that deems valid the operation output of the short-circuit distance relay element, irrespective of the result of the decision of the second means or third means if the operation phase of the short-circuit distance relay element exists for two or more phases.

Another invention consists of a digital distance relay having a short-circuit distance relay element that inputs respectively the voltage and current from an AC power system of three phases a, b and c, calculates a fault impedance from these voltages and currents and compares this with a set impedance and that, depending on the result of this comparison, makes an operation decision in the event of a fault within a transmission line protection zone, comprising: a first means for calculating the amplitudes |Vab|, |Vbc|, and |Vca| of the line-to-line voltages of the three phases; a second means for making a comparison decision of the absolute value ($|V\Delta|=||Vab|-|Vbc||$) (rotated in phase order for the other phases) of the phase-to-phase difference of the voltage amplitudes and a sensitivity constant Vk; a third means for making a comparison decision of the phase-to-phase difference ($V_A=|Vab|-|Vbc|$)(rotated in phase order for the other phases) of the voltage amplitudes and Vk; a fourth means that selects the minimum phase ($|Vmin|=min(|Vab|, |Vbc|, |Vca|)$) of the absolute values of the line-to-line voltages of the three phases; a fifth means that deems valid the operation output of the short-circuit distance relay element if the phase for which $|V\Delta|<Vk$ in said second means and said third means is untrue and $V_A>Vk$ is true, or the minimum phase selected by the fourth means is the same as the single-phase operation phase of the short-circuit distance relay element; and a sixth means that deems valid the operation output of the short-circuit distance relay element, irrespective of the result of the decision of the second means or third means or fourth means if operation phase of the short-circuit distance relay element exists for two or more phases.

Another invention consists in a digital distance relay having a short-circuit distance relay element that inputs respectively the voltage and current from an AC power system of three phases a, b and c, calculates a fault impedance from these voltages and currents and compares this with a set impedance and that, depending on the result of this comparison, makes an operation decision in the event of a fault within a transmission line protection zone, comprising: a first means for calculating the amplitudes |Vab|, |Vbc|, and |Vca| of the line-to-line voltages of the three phases; a second means for making a comparison decision of the absolute value ($|V\Delta|=||Vab|-|Vbc||$) (rotated in phase order for the other phases) of the phase-to-phase difference of the voltage amplitudes and a sensitivity constant Vk; a third means for making a comparison decision of the phase-to-phase difference ($V_{66}=|Vab|-|Vab|Vbc|$)(rotated in phase order for the other phases) of the voltage amplitudes and the Vk; a fourth means that selects the minimum phase ($|Vmin|=min(|Vab|, |Vbc|, |Vca|)$) of the absolute values of the line-to-line voltages of the three phases; a fifth means that deems valid the operation output of the short-circuit distance relay element if the phase for which $|V\Delta|<Vk$ in the second means and the third means is untrue and $V_A>Vk$ is true, or the minimum phase selected by the fourth means is the same as the single-phase operation phase of the short-circuit distance relay element; and a sixth means that deems valid the operation output of the short-circuit distance relay element, irrespective of the result of the decision of the second means or third means or fourth means if operation phase of the short-circuit distance relay element exists for two or more phases.

Another invention consists in a digital distance relay having a short-circuit distance relay element that inputs respectively the voltage and current from an AC power system of three phases a, b and c, by multiplying the input current by a set impedance, converts this to a voltage amount, calculates the phase difference or absolute value difference with the input voltage as an operation amount and restriction amount, compares the magnitudes of these, and, in accordance with this comparison result, makes an operation decision in the event of a fault within a transmission line protection zone, comprising: a first means for calculating the amplitudes |Vab|, |Vbc|, and |Vca| of the line-to-line voltages of the three phases; a second means for making a comparison decision of the absolute value ($|V\Delta|=||Vab|-|Vbc||$) (rotated in phase order for the other phases) of the phase-to-phase difference of the voltage amplitudes and a sensitivity constant Vk; a third means for making a comparison decision of the phase-to-phase difference ($V_A=|Vab|-|Vbc|$) (rotated in phase order for the other phases) of the voltage amplitudes and Vk; a fourth means that selects the minimum phase ($|Vmin|=min(|Vab|, |Vbc|, |Vca|)$) of the absolute values of the line-to-line voltages of the three phases; a fifth means that deems valid the operation output of the short-circuit distance relay element if the phase for which $|V\Delta|<Vk$ in said second means and said third means is untrue and $V_A>Vk$ is true, or the minimum phase selected by the fourth means is the same as the single-phase operation phase of the short-circuit distance relay element; and a sixth means that deems valid the operation output of the short-circuit distance relay element, irrespective of the result of the decision of the second means or third means or fourth means if operation phase of the short-circuit distance relay element exists for two or more phases.

With immediate mentioned former four inventions, a minimum phase voltage condition is added to the operation decision of the short-circuit distance relay, so unwanted operation due to over-reach of a sound phase element can be prevented, making it possible to achieve stable operation correctly responding to the faulted phase only.

Another invention consists of a digital ground fault distance relay having ground fault distance relay elements that input respectively the voltage and current from an AC power system of three phases a, b and c, calculate a fault impedance from these voltages and currents and compare this with a set impedance and that, depending on the result of this comparison, make an operation decision in the event of a fault within a transmission line protection zone, comprising: a first means that makes an operation decision of an insufficient voltage relay in accordance with a phase voltage; a second means that identifies whether or not the operation result obtained from this first means is present for two or more phases; and a third means that, if the operation phase is present for two or more phases in this second means, performs output control of all of the operation outputs of the ground fault distance relay elements to the non-actuated side.

Another invention consists of a digital ground fault distance relay having a ground fault distance relay element that inputs respectively the voltage and current from an AC power system of three phases a, b and c, calculates a fault impedance from these voltages and currents and compares this with a set impedance and that, depending on the result of this comparison, makes an operation decision in the event of a fault within a transmission line protection zone, and an mho relay element of a third-stage time-limited operation zone, comprising: a first means that identifies whether or not the previous-stage relay unit operation output constituting time-limited operation of the mho relay element is present for two or more phases; and a second means that, if the operation phase is present for two or more phases in this first means, performs output control of the operation decision output of the ground fault distance relay element to the non-actuated side.

Another invention consists in a digital ground fault distance relay having ground fault distance relay elements that input respectively the voltage and current from an AC power system of three phases a, b and c, by multiplying the input current by a set impedance, convert this to a voltage amount, calculate the phase difference or absolute value difference with the input voltage as an operation amount and restriction amount, compare the magnitudes of these, and, in accordance with this comparison result, make an operation decision in the event of a fault within a transmission line protection zone, comprising: a first means that makes an operation decision of an insufficient voltage relay in accordance with a phase voltage; a second means that identifies whether or not the operation result obtained this first means is present for two or more phases; and a third means that, if the operation phase is present for two or more phases in this second means, performs output control of all of the operation outputs of the ground fault distance relay elements to the non-actuated side.

Another invention consists of a digital ground fault distance relay having ground fault distance relay elements that input respectively the voltage and current from an AC power system of three phases a, b and c, by multiplying the input current by a set impedance, convert this to a voltage amount, calculate the phase difference or absolute value difference with the input voltage as an operation amount and restriction amount, compare the magnitudes of these, and, in accordance with this comparison result, make operation decisions in the event of a fault within a transmission line protection zone, and an mho relay element, comprising: a first means that identifies whether or not the previous-stage relay unit operation output constituting time-limited operation of the mho relay element is present for two or more phases; and a second means that, if the operation phase is present for two or more phases in this first means, performs output control of all of the operation decision outputs of the ground fault distance relay elements to the non-actuated side.

With the immediate mentioned former four inventions, the single-phase operation condition of an insufficient voltage relay element or mho relay element is added to the operation decision of the ground fault distance relay, so unwanted operation due to over-reach of a sound phase element can be prevented, making it possible to achieve stable operation correctly responding to the faulted phase only.

BRIEF DESCRIPTION OF THE DRAWINGS

A more complete appreciation of the invention and many of the attendant advantages thereof will be readily obtained and better understood by reference to the following detailed description when considered in connection with the accompanying drawings.

FIG. 4 shows a first-stage zone and the impedance seen by the short-circuit distance relay in the event of a fault in an adjacent zone.

FIG. 5 shows a first-stage zone and the impedance seen by the short-circuit distance relay in the event of a fault in the home zone.

FIG. 6(a) shows the voltage and current vectors before and after a more-distant bc-phase 2φS fault.

FIG. 6(b) shows the directional element operation tendency in the event of such a fault.

FIG. 7 shows an input waveform in the event of a simulated more-distant 2φS fault from the load current condition in the form of an oscilloscope waveform of the operation output.

DETAILED DESCRIPTION OF THE PREFERRED EMBODIMENTS

Embodiments of this invention are described below with reference to the drawings.

Figure 1:
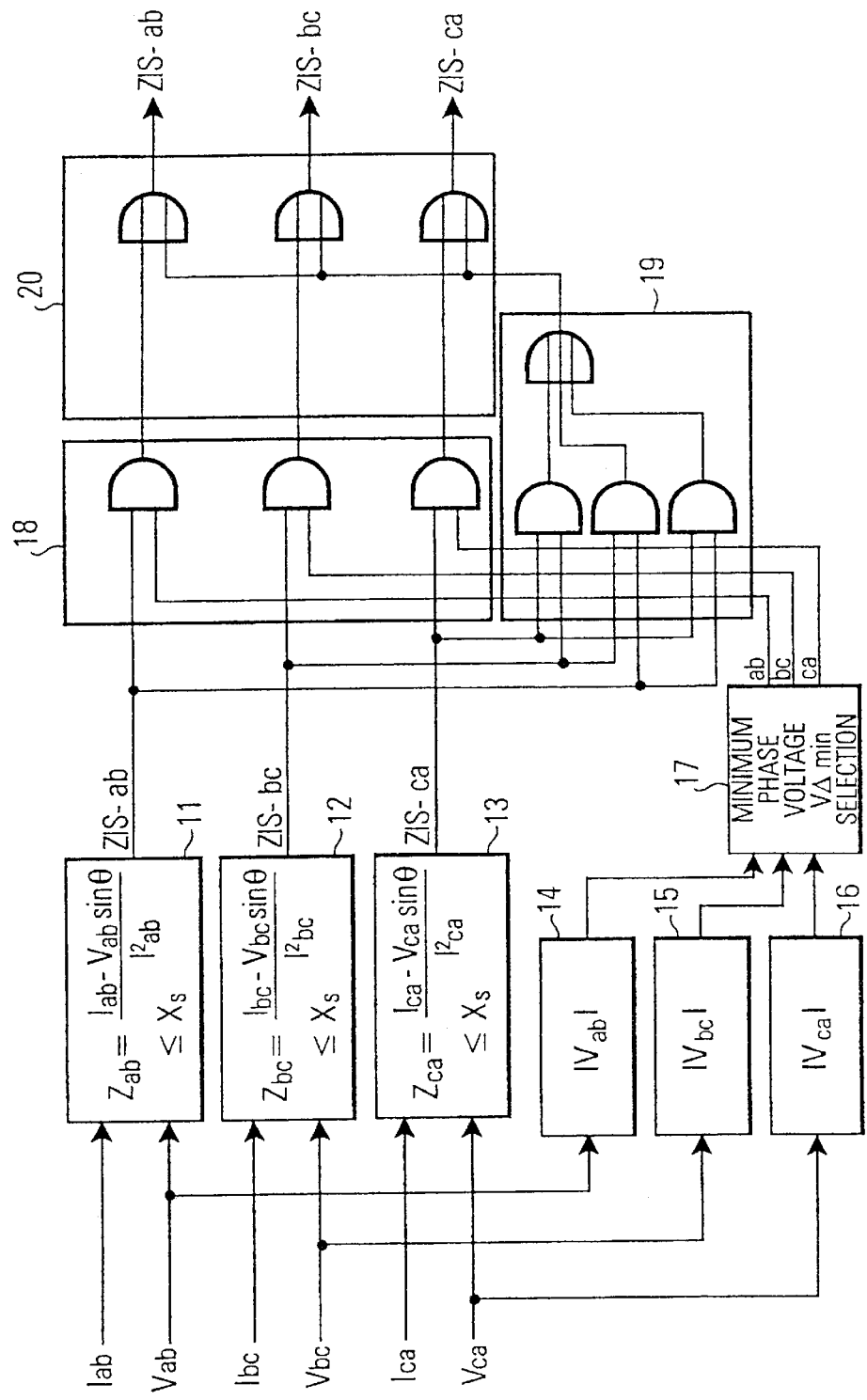
FIG. 1 shows a functional block diagram of a first embodiment of a distance relay in connection with the present invention.

FIG. 1 is a functional block diagram showing a first embodiment of a distance relay in connection with this invention.

In FIG. 1, an operation judging unit 11 judges an operation of a short-circuit distance relay (ZIS) in an "ab" phase of a three-phase AC power system of phases a, b, c.

This ZIS-ab element operation decision unit 11 finds the fault impedance Zab from a phase-to-phase voltage Vab and a phase-to-phase current Iab, and makes a comparative decision with respect to a set impedance Xs.

If the Zab is smaller, a judging signal is output from the ZIS-ab element operation judging unit 11.

Here, "setting impedance" means the limit of the distance relay of the operation, "fault impedance" means the electrical distance to the fault location by calculating in the distance relay.

Likewise, operation decision units 12 and 13 judge operations of a ZIS-bc element, and a ZIS-ca element in a "bc" phase and a "ca" phase, respectively.

The ZIS element operation judging units 12 and 13 find the fault impedance Zbc and Zca from phase-to-phase voltages Vbc and Vca and phase-to-phase currents Ibc and Ica and effect respective comparative judging with regard to a set impedance Xs.

If Zbc, Zca are smaller, operation judging signals are output from ZIS-bc, ZIS-ca element operation judging units 12, 13.

In the ZIS element operation judging unit 11, "θ" means phase of Vab, Iab. (This definition applies to "θ" in FIG. 10.) In the ZIS element operation judging unit 12, "θ" means phase of Vbc, Ibc. (This definition applies to "θ" in FIG. 10.) In the ZIS element operation judging unit 13, "θ" means phase of Vca, Ica. (This definition applies to "θ" in FIG. 10.)

Also, calculating units 14 to 16 are provided for the phase-to-phase voltage amplitudes in the ab-phase, bc-phase and ca-phase of the three-phase AC power system, according to a well-known way. These calculating units 14 to 16 calculate the amplitudes of Vab, Vbc, Vca, respectively.

Further, a minimum phase voltage selection unit 17 selects the minimum voltage phase ($V_A$min) of a phase-to-phase voltage amplitudes found by calculating units 14 to 16.

A faulted phase element output control unit 18 takes the AND of the minimum voltage phase ($V_A$min) selected by this minimum phase voltage selection unit 17 and the operation phase judging signals of ZIS-ab, ZIS-bc, and ZIS-ca elements 11 to 13, and delivers an output signal if this AND condition is satisfied.

Also, an operation output control unit 19 judges whether or not two or more operated phases of ZIS elements are present.

A final operation output control unit 20 outputs an OR signal of the output phases of the ZIS elements obtained by the output control unit 18 and the operation output control unit 19.

The method of calculating the fault impedance Zab, Zbc, and Zca by means of operation judging units 11 to 13 of a short-circuit distance relay is not the main essence of this invention, so a detailed description thereof is omitted.

However, the method of, for example, Japanese Patent Publication No. H.3-20969 and pp.51–64, pp.119–127 of "Protective Relay Engineering" published on Jul. 21, 1981 by Denki Gattkai discloses an the differential equation principle.

Next, the operation of operation output judging logic of the short-circuit distance relay using a minimum value of the voltage amplitude will be described.

Since AND processing of the amplitude value $|V_A|$ (equal to |Vab|, |Vbc| and |Vca|) of the phase-to-phase voltages by the calculating units 14 to 16 with the operated phase of the short-circuit distance relay is performed after selection of the minimum phase voltage ($V_A$min), as will be described, for timing consideration, the amplitude value calculation by the calculating units 14 to 16 must be performed with a higher-speed calculation than the operation judging of the operation judging units 11 to 13.

Here, "time coordination" is performed to match of the operating time between two or more relays and reset time to attain the desired result.

Of the three phase amplitudes |VΔ found by these calculating units 14 to 16, the minimum phase voltage is selected by a minimum phase voltage selection unit 17.

Figure 2:
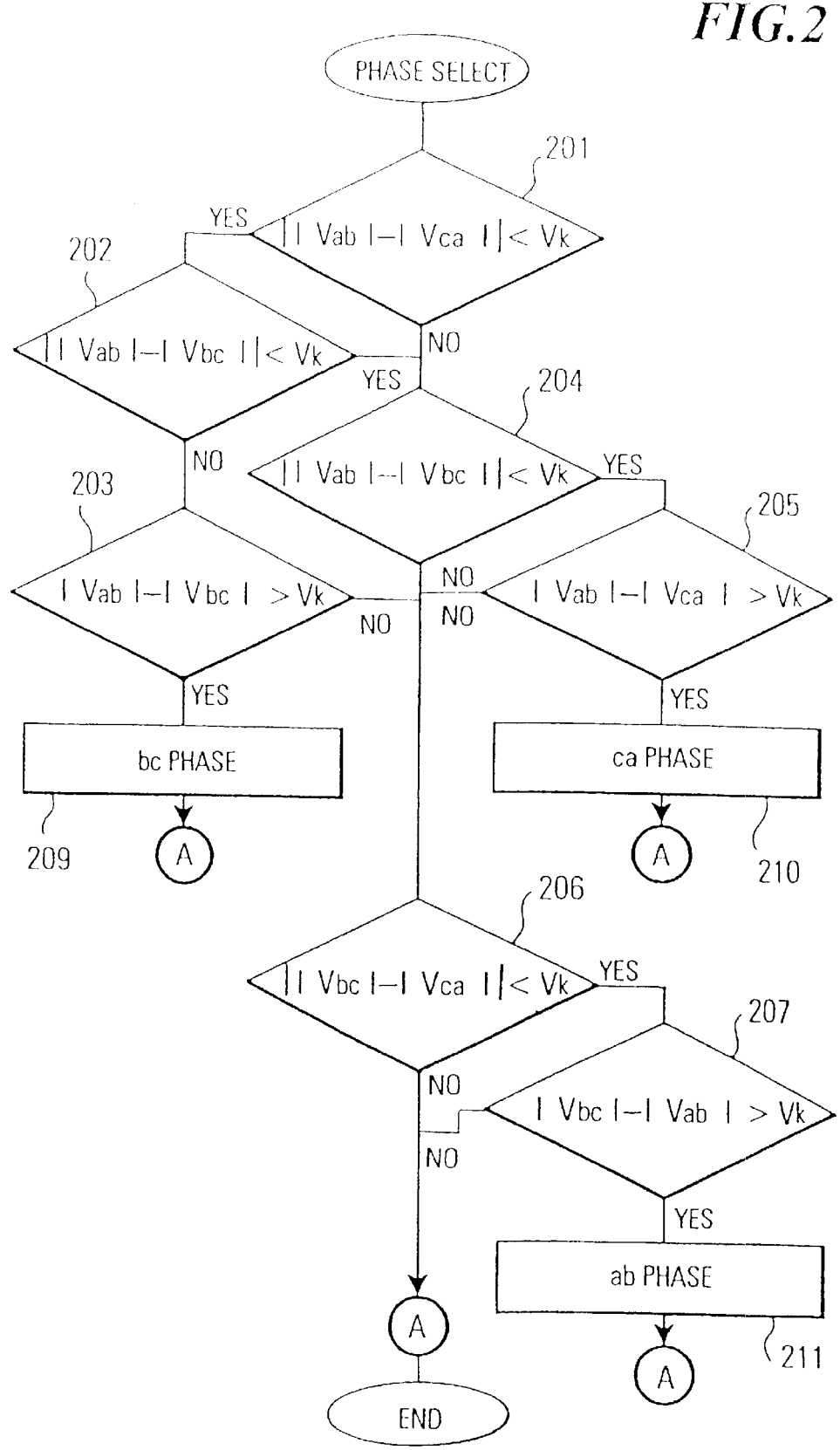
FIG. 2 shows a flow-chart of a first embodiment of a distance relay in connection with the present invention.

FIG. 2 is a flow chart (comprised of steps 201–211 inclusive) showing the processing for selecting the minimum phase voltage performed by the minimum phase voltage selection unit 17.

In steps 201 to 207 in FIG. 2, a comparison judging is performed of the relative values and absolute values of the amounts of change and sensitivity constant Vk ( this value is determined by an applied system) of the three phase voltage amplitudes |Vab|, |Vbc|, and |Vca| found by the calculating units 14 to 16, respectively.

Here, steps 201 to 203 representing the bc-phase judging will be explained. That is, as a comparative example, the bc-phase is set as the phase of lag.

Firstly, in step 201, a level judging is performed in the phase of lead/phase of lag with reference to the bc-phase.

The judging of the absolute value of the difference ||Vab|−|Vca||<Vk of the corresponding voltages of the sound phases (which are practically in equal relationship) gives the result that this magnitude comparison is true, so processing shifts to the next step 202.

The sensitivity constant Vk on the right-hand side may be thought of as consisting of (mainly) the PT error: about 3%; the analogue input unit error: about 1%; and the calculation error of the amplitude: 1%, approximately, giving a total of 5% sensitivity taking the maximum values of these. Thus, about 0.05 pu (110 V×5%=5.5 V) is available.

Next, turning to the bc-phase, the level of Vbc is determined in respective steps 202, 203. Here, Vab of phase of lag is taken as the subject of comparison, and Vca of phase of lead is taken as the subject of comparison.

In step 202, the absolute value difference judging ||Vab|−|Vbc||<Vk is performed. Due to the relationship of sound phase voltage (Vab, Vca)>>faulted phase voltage (Vbc), this magnitude relationship is found to be untrue, so processing advances to step 203, in which the level width of the sensitivity constant Vk is detected.

In step 203, the absolute value difference judging ||Vab|−|Vbc|>Vk succeeds, so in step 209 the bc-phase is identified.

If, in step 202, the expression is found to be true or if in step 203 the expression is found to be false, this judging processing is bypassed.

The same processing is subsequently carried out for the other phases.

Next, the output control unit 18 verifies coincidence of the operated phase of the ZIS element and the voltage minimum value.

Even if, exceptionally, it should happen that there is a fault in two phases (bc-phase) in the ZIS element judging units 11 to 13, due to the AND condition of the output control unit 18, unwanted operation can be prevented.

As above, since, in a three-phase fault, the sound phase voltage disappears and the minimum phase voltage disappears, with the result that the judging made by the minimum phase voltage selection unit 17 becomes invalid, if the operated phase of the ZIS element is established for two or more phases by the output control unit 19 of the operation phase, t he operation output is given priority by the OR gate.

As a result, the output circuit is divided into two in the event of a two-phase (bc-phase) fault (an operation of ZIS element of one phase) and in the event of a three-phase fault (an operation of the ZIS elements of two or more phases).

And, the OR of these two is taken by the output control unit 20 of the final operation. Therefore, a stable operation in the event of a three phase fault can be achieved by combining this with the sound phase over-reach countermeasures for the case of a two-phase fault.

In the embodiment described above, the processing function of the minimum phase voltage selection unit 17 was described with reference to the flow chart shown in FIG. 2.

Figure 3:
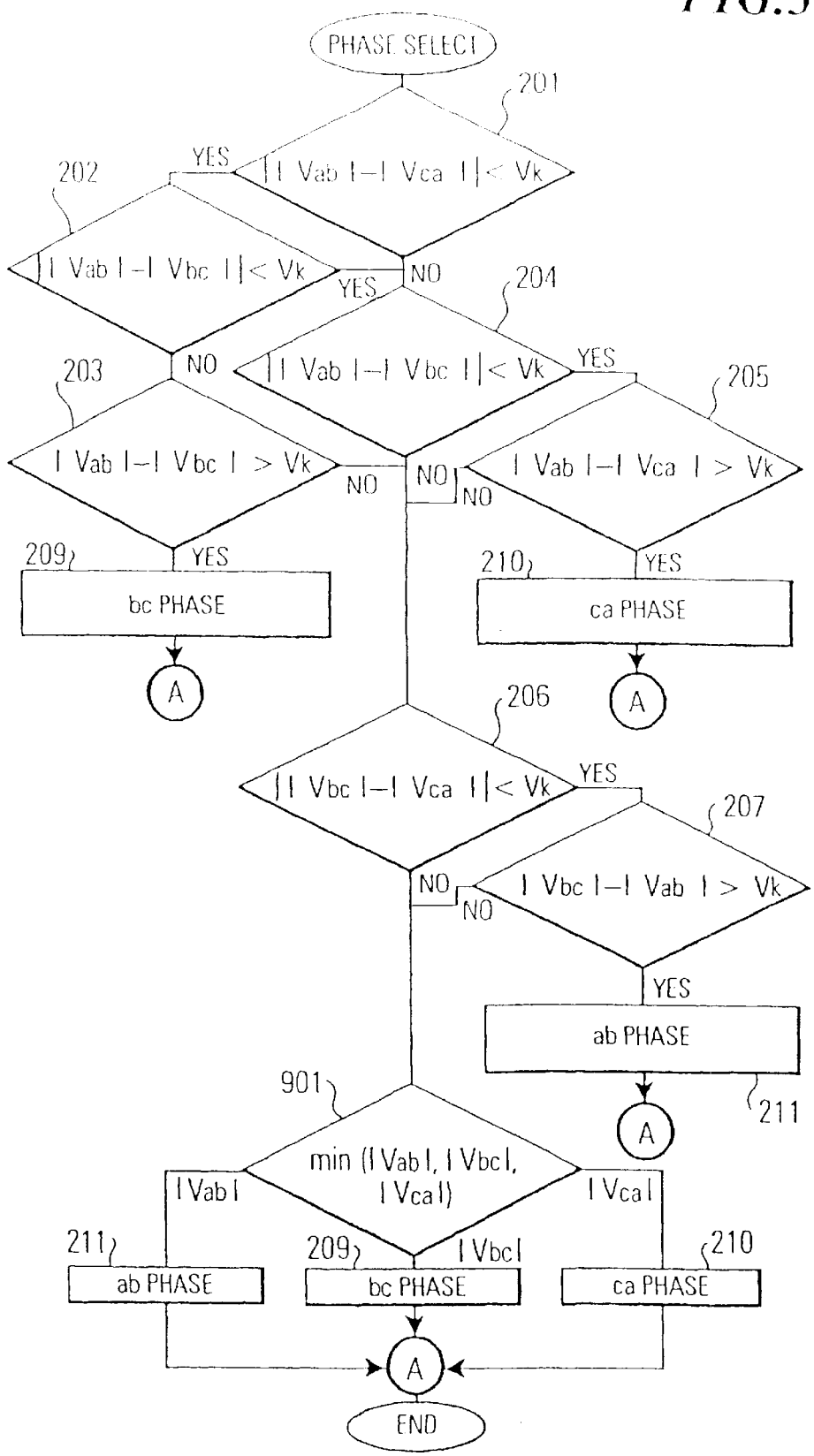
FIG. 3 shows a flow-chart in which minimum phase voltage detection processing is added to the processing for selection of a minimum phase voltage.

However, as the processing function of the minimum phase voltage selection unit 17, as shown in FIG. 3 (a flow chart comprised of steps 201–211 inclusive), a minimum phase voltage detection processing 901 can be added in addition to a voltage difference judging processing 201 to 207. This performs minimum phase detection {min (|Vab|, |Vbc|, |Vca|)} as a backup to enable a minimum phase voltage to be obtained when none of the steps 201, 204 and 206 enable a judging to be established. The same operation and benefits as described above can be obtained with the minimum phase voltage selection unit 17 also.

Next, the protective operation using the short-circuit distance relay constructed as above in the event of a system fault will be described.

The means of detection used for-faulted phase discrimination for the result of operation judging of the ZIS element constituting the first stage of the short-circuit distance relay is to find the voltage minimum phase from the amplitude values of the phase-to-phase voltage amounts. Here, each equation is judged with a fixed amplitude width.

$|V_A|$: the difference value of the amplitudes

Vk: the sensitivity constant value

1) $|V_A| < Vk$

2) $V_A > Vk$

The effect of these amplitudes will now be described.

If, when finding the minimum phase voltage, the comparison is effected purely in terms of an absolute value of the amplitude, the minimum phase voltage is influenced by phase-to-phase variability of the main transformer on the system side or by errors produced by differences of individual items of hardware constituting the analogue input unit on the relay side.

To reduce these causes of error, a comparison of amplitudes is employed with a bandwidth based on a certain fixed value Vk. For example, in the case of selection of the bc-phase, Vbc is selected with the conditions: Vab–Vbc>Vk true and |Vab–Vbc|<Vk false.

In this case, even considering a timing in which no minimum phase is selected from the difference calculation results in voltage change during a transient response period, if a function is provided for selecting a minimum phase voltage by reference to the absolute value base of the three-phase voltage amplitudes, one phase will definitely be selected.

Next, the operation output of the ZIS element is regarded as valid only when the one phase selected as a voltage minimum value and the operation phase of the ZIS element are the same.

This has the effect of preventing unwanted operations in the case of a fault between an adjacent zone as shown in FIG. 4, where the ZIS element of the sound phase (ab-phase) is a single-phase over-reach while the ZIS elements of the fault phase (bc-phase) and the sound phase (ca-phase) are not operated, resulting in an instantaneous operation of the first stage of the ZIS element.

Specifically, although the ZIS element of the sound phase (ab-phase) tends to be operated in the event of a two-phase fault because the Zab is in the operating area, if the voltage of this operated phase (ab-phase) is not selected as a minimum phase(i.e., it is not a faulted phase), the output of the ZIS element of the sound phase (ab-phase) is inhibited by AND function.

That is, the operation output of the ZIS element of the sound phase (ab-phase) is only regarded as valid if the ZIS element of the operated phase and the voltage minimum phase are the same. In contrast, in the event of a three-phase fault, no minimum phase of the phase-to-phase voltages exists, so reliable faulted phase detection is not possible.

Consequently, in the event of a three-phase fault (i.e., where the ZIS elements of two or more phases are operated), the operation output of the ZIS elements is taken as valid, irrespective of the result of the minimum phase judging. That is, where, in the case of a three-phase fault, the ZIS elements of two or more phases are operated, the operation output of the ZIS elements is regarded as valid, irrespective of the voltage minimum phase selection condition.

As shown in FIG. 5, in the case where a ZIS element of a faulted phase (bc-phase) is operated by a two-phase fault in a home zone, and the ZIS element of the sound phase (ab-phase) is also operated because the Zab is in the operating area, there is a possibility that the sound phase (ab-phase) may deliver an operation output due to the two-phase operation of the aforesaid ZIS elements.

But, since, in terms of the device system, a fault removal (three-phase trip) is performed by correct operation by OR function of the ZIS elements of the faulted phase (bc-phase) and the operated phase (ab-phase), there is no possibility of the protective function being impeded.

Hereinabove, the validity of the sound phase over-reach countermeasures in the case of a fault in the adjacent zone, and countermeasures for the correct operation in the case of the home zone three-phase fault are described. Further, these also improve the direction discrimination performance in the case of reverse fault at even greater distance, by using the minimum phase voltage judging.

The output inhibition effect and the phase of lag operation tendency in the case of heavy power flow are described below.

In FIGS. 4 and 5, X means "reactance", R means "resistance".

FIG. 6($a$) shows the relationship of a typical voltage and current vectors in the event of a short-circuit fault of bc-phase in reverse, even in the case of "Vbc≈0".

Here, the distance relay with impedance relay element has characteristic to look ahead and find forward fault. That is, the distance relay with impedance relay element can't find fault backward (equal to "in reverse"), correctly. To solve this problem, direction judging of the current is performed by means of the phase difference of the polarity voltage Vp and the IF (=IL–IF') obtained by superimposing the fault current IF on the load current IL prior to the fault.

The "polarity voltage Vp" refers to a quantity of electricity as the criteria of the direction judging to the fault location.

Further, the general expression for direction judging in an mho relay element is found by an equation (1); operation occurs if the phase difference "θ" of Vp and IF is less than 30°.

$$Mz \times IF * Vp\cos(\theta - 60°) - VF * Vp > 0 \quad (1)$$

where Mz is the setting value, the sensitivity angle is 60°, and * denotes an inner product.

FIG. 6(b) shows the magnitude and phase of the voltage and current of the phase (ca-phase) of lag in the event of a fault of bc-phase in reverse, and the operation region of the direction discrimination element.

It can be seen that the degree of margin in respect of in-operation is small. As the degree of margin is small, there is a possibility that the distance relay does malfunction by calculating error and external noise, etc.

In this connection, if the minimum phase detection condition as described above is added, Vca is not detected as the minimum phase, so the tendency of the ZIS-ca element to be operated can be avoided.

FIG. 7 shows the input waveforms and the relay operation output from an oscilloscope taken under these conditions. Here, F1 and F3 are the impedance. That is, F1 is a location of the impedance before the fault happens, t1 is the time when F1 is calculated, F3 is a location of the impedance after the fault occurs in reverse, and t3 is the time when F3 is calculated.

When a bc-phase fault occurs in reverse, waveforms of Ib, Ic, Vb and Vc abnormaly change from t1 to t3. That is, as the fault current is added to Ib and Ic, as a result, an amplitude of the waveforms of Ib and Ic get large between t1 and t3. And, likewise, an amplitude of the waveforms of Vb and Vc becomes small between t1 and t3 because the phase of Vb and Vc is reverse with respect to the phase of Va.

FIG. 7 shows that the ZIS'-c-phase may be operated though ca-phase in the sound phase. However, an incorrect operation at the final-stage ZIS'-ca-phase can be detected because of the AND function, even though the ZIS'-ca-phase is operated by a calculating error or an external noise, etc. Here "Correct Inoperation" means that the relay does not operate when it should not operate.

In the embodiment described above, a calculation system is described in which an operation judging by the distance relay is performed by directly calculating the impedance component.

However, it would alternatively be possible to convert the impedance to a voltage from the current and the setting value, so that the impedance is equivalently replaced by the voltage. As the principle of this operation judging, for example, the phase difference judging system or absolute value comparison system described in "Protective Relay Engineering" published on Jul. 20, 1981 by the Electrical Association of Japan, p.122 may be applied.

Figure 8:
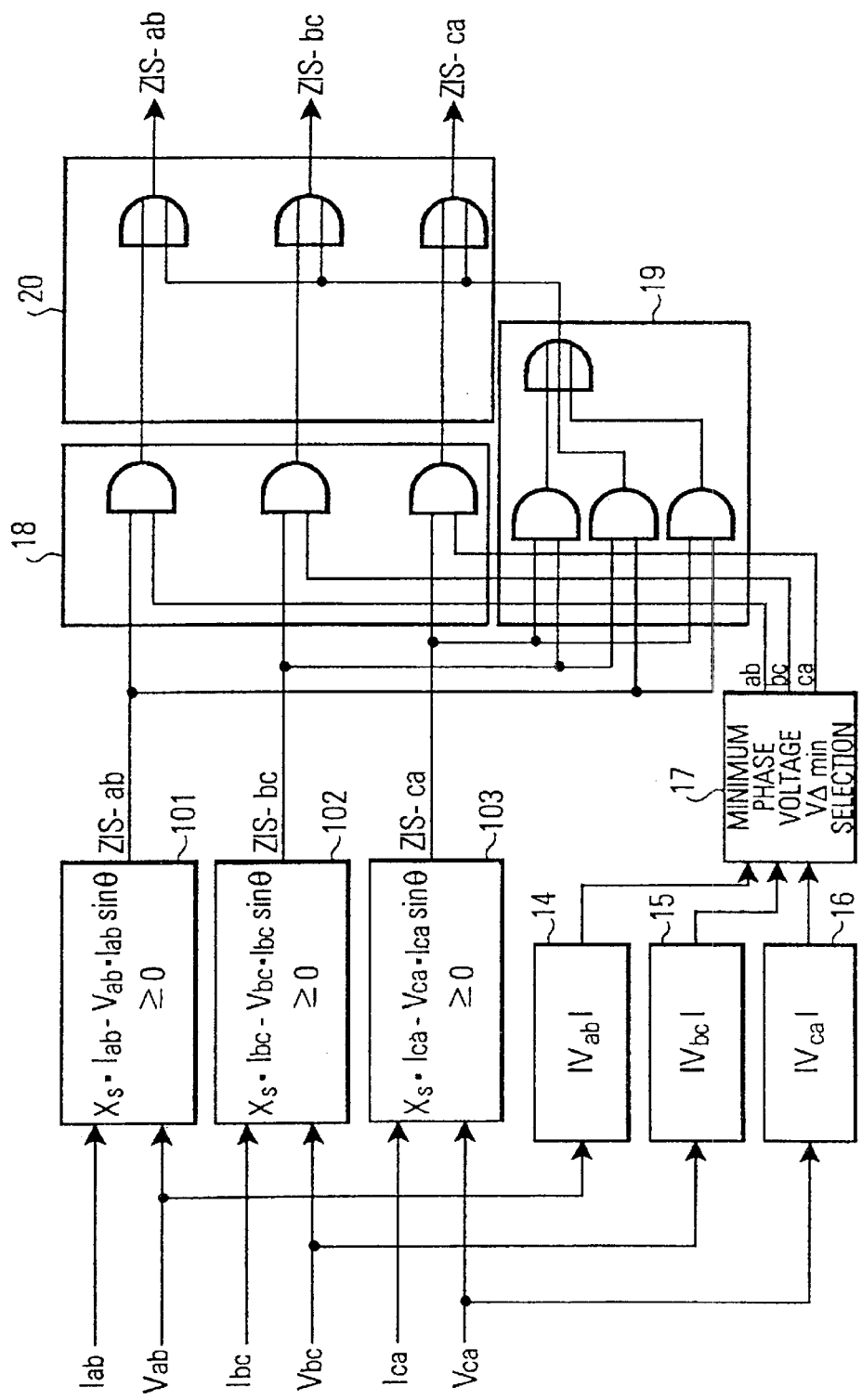
FIG. 8 is a functional block diagram of a second embodiment of a distance relay in connection with the invention.
Figure 9:
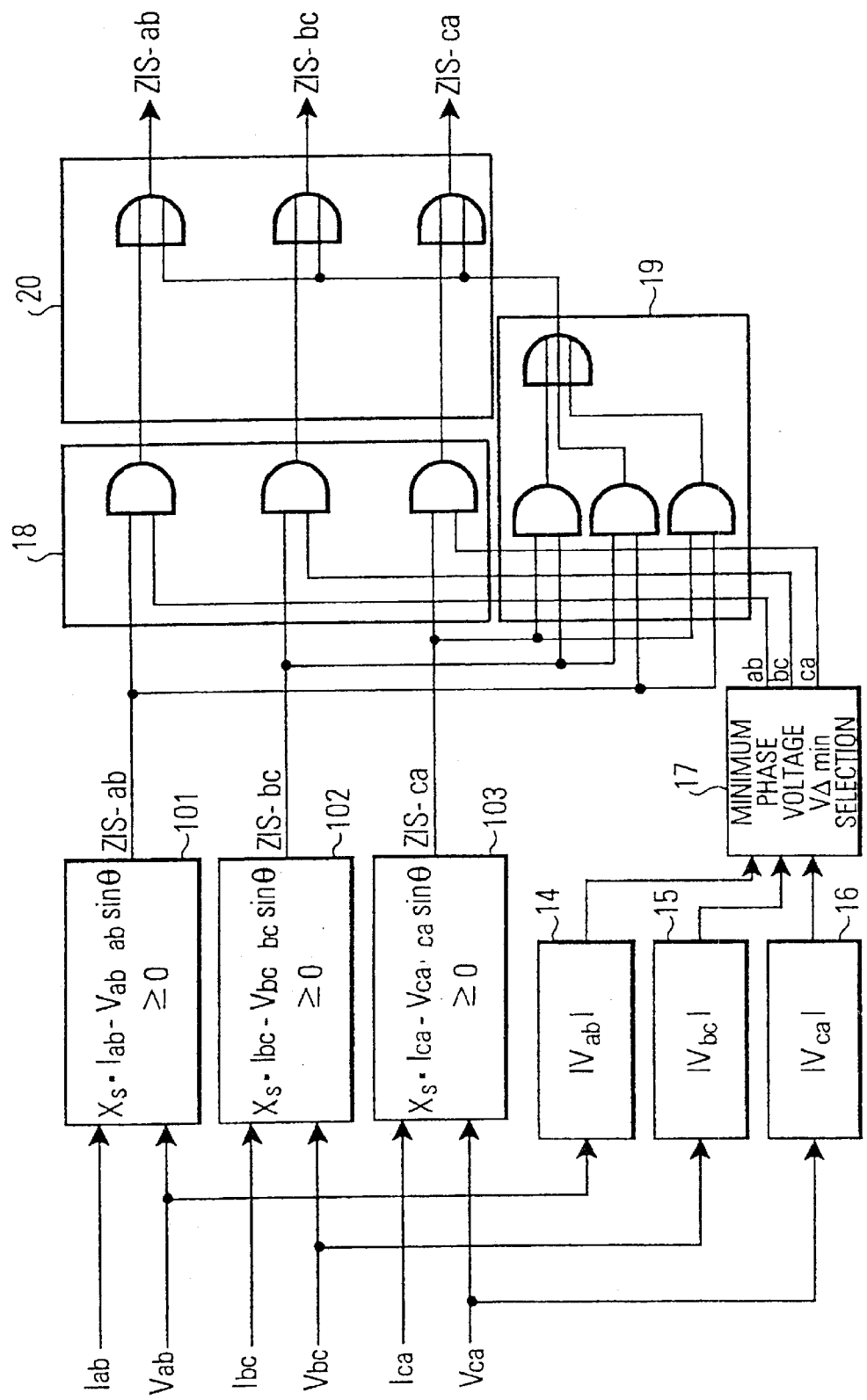
FIG. 9 is a functional block diagram of a third embodiment of a distance relay in connection with the invention.

FIG. 8 and FIG. 9 are functional block diagrams of the second and third embodiments of a distance relay in connection with the present invention in which such a judging system is adopted. The difference from FIG. 1 is that, as a ZIS element operation judging units 101 to 103, conversion is effected into a voltage amount by multiplying the current by a set impedance, the phase difference or absolute value difference with respect to the introduced voltage being calculated as an operating quantity and a restraint quantity, judging of operation in the internal fault within the transmission line protection zone being performed in accordance with the result of a magnitude comparison of these. Here, "operating quantity" means a quantity of electricity which acts in a direction in which the relay operates. The "restraint quantity" means a quantity of electricity which acts in an opposite direction to the direction in which the relay operates.

Thus, in FIG. 8, the minimum phase in the minimum phase voltage selection unit 17 is selected by the processing of FIG. 2.

In FIG. 9, the minimum phase in the minimum phase voltage selection unit 17 is selected by the processing of FIG. 3. The same operations and benefits as in the case of FIG. 1 are of course obtained with these constructions.

Figure 10:
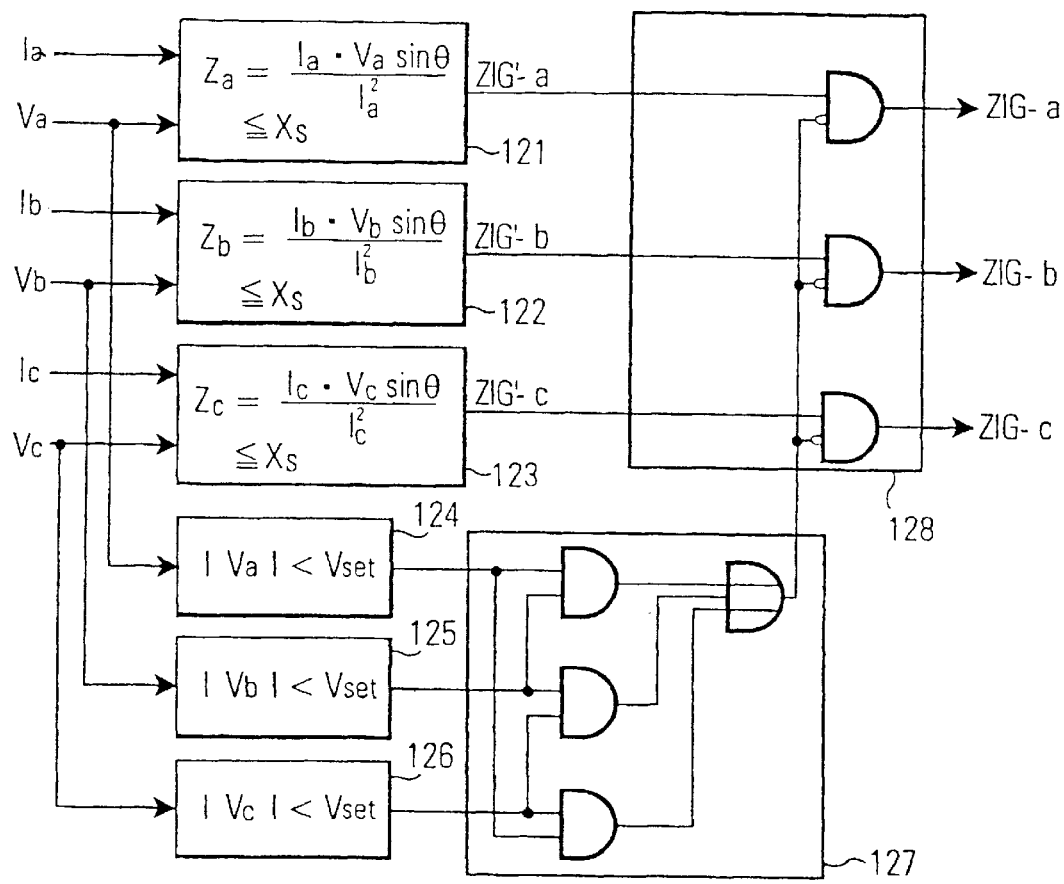
FIG. 10 is a functional block diagram of a fourth embodiment of a distance relay in connection with the invention.

FIG. 10 shows a functional block diagram illustrating a fourth embodiment of a distance relay in connection with this present invention. In FIG. 10, an operation judging unit 121 judges an a-phase ground fault distance relay (ZIG-a) element of a three-phase AC power system of phases a, b, c.

The operation judging unit 121 finds the fault impedance Za from the a-phase voltage Va and a-phase current Ia and compares it with set impedance Xs.

If Za is smaller, an operation judging signal is output from the ZIG-a element operation judging unit 121.

Likewise, operation judging units 122 and 123 are related to the ZIG elements of the b-phase and c-phase, respectively.

The operation judging units 122, 123 find the fault impedance Zb, Zc from the b-phase voltage Vb and b-phase current Ib and the c-phase voltage Vc and c-phase current Ic and compare these with set impedance Xs, and, if Zb, Zc are smaller, respectively, output operation judging signals from the ZIG-b element operation judging unit 122 and ZIG-c element operation judging unit 123.

Also, judging units 124 to 126 judge the operation of insufficient voltage relay (UV-a, UV-b, UV-c) elements to which are respectively input the respective phase voltages, and that the judging units 124 to 126 deliver output signals by being operated when the phase voltage amounts are smaller than a set voltage.

An output control unit 127 identifies whether or not two or more phases of the judging units 124 to 126 of UV-a, UV-b, UV-c elements are operated.

If two or more phases are operated, the output control unit 127 delivers an output signal.

As an example of a method for calculation done by judging units 124 to 126 of UV-a, UV-b, UV-c elements, the method disclosed in Japanese Patent Publication No. H.3-20969 ( as differential equation principle) and pp.22–26, pp.135–137 of "Protective Relay Engineering" published by Denki Gattkai can be used.

Furthermore, an output control unit 128 locks the operation judging signal that is output from the operation judging units 121 to 123 of the ZIG elements of each phase when an output signal is output from the output control unit 127. Except for whether the calculation quantities are phase-to-phase quantities or quantities of the respective phases, the system for calculating the fault impedance Za to Zc by the operation judging units 121 to 123 of the ZIG elements of each phase is found in the same as in the case of FIG. 1.

A detailed description thereof is therefore omitted.

Next, the operation of the output judging logic of the ground fault distance relay using the operation condition of the UV element will be described.

The judging units 124 to 126 of the UV element of each phase calculate the amplitudes from the voltages of each phase, and compare these with setting value Vset. Here, "Vset" is decided by the system. If they are smaller than Vset, they output an operation signal.

Also, the judging units 124 to 126 of the UV elements of each phase are operated in response to the faulted phase.

In the event of a single-phase fault, only the single-phase corresponding to the fault is operated, and, in the event of a fault on two or more phases, a plurality of phases are operated. In regard to the output of the judging units 124 to 126 of the UV element of each of these phases, identification of the operated phase is performed by the output control unit 127.

In the event of a fault on two or more phases, the judging signal of the operation judging units 121 to 123 of the ZIG element is locked by the output signal that is output to the final output control unit 128 from the output control unit 127. That is, output is provided for the ground fault distance relay ZIG of the ground faulted single phase only.

Next, the protective operation of the ground fault distance relay constructed as above in the event of a system fault will be described.

The operating duty of the ground fault distance relay is concerned solely with the single-phase ground fault (faults involving two or more phases are within the range of protection of the ZIS operation). And, it acts to prevent unwanted operation of the ZIG in faults involving two or more phases where there is a risk of over-reach.

This discrimination between the single-phase ground faults and faults involving two or more phases is performed on the basis of the UV element operated phase. If the UV element of only one phase is operated, operation of the ZIG element is regarded as valid; if the UV elements of two or more phases are operated, operation of the ZIG element is regarded as invalid.

In the event of a fault involving two or more phases, ZIG operation is prioritized. As a result, an unwanted ZIG operation in the event of a fault on two or more phases can be prevented, so a stable response that is operated only by single-phase faults can be reliably anticipated.

Figure 11:
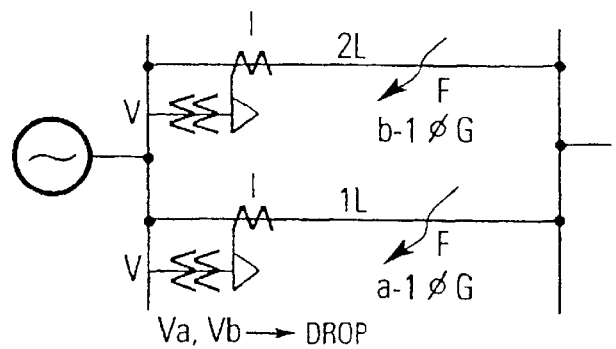
FIG. 11 is a parallel two-circuit system diagram of a condition in which a single-line ground fault has occurred in different phases of the two circuits in a bus line voltage.

Furthermore, considering the case where the application system is one in which voltage is taken from the bus by a parallel two-circuit line as shown in FIG. 11, in the case where multiple faults of different phases appear on both circuits, for example 1L: a-phase—1φG, 2L: b phase—1φG faults, due to the effect of the bus voltage drop, the UV element will be operated on both 1L and 2L and on both faulted a phase and faulted b phase.

The UV element of two or more phases is thereby operated and, as a result, operation output of the faulted phase 1L ZIG-a element and 2L ZIG-b element, constituting the operating duty, is inhibited. Accordingly, faulted phase judging is performed using the operation result of the UV element in order to do operation response in the event of a single-phase ground fault only, which is the basic object of the ground fault distance relay.

In the event of UV operation on two or more phases, the operation judging is entrusted to the aforementioned ZIG elements. As a result, the operation elements can be divided between short-circuit/ground faults. That is, this makes it possible to achieve independence of the logic judging and to avoid unwanted operation of ZIG elements in the case of faults involving two or more phases.

Therefore, stable operation in the event of a fault can be anticipated.

Figure 12:
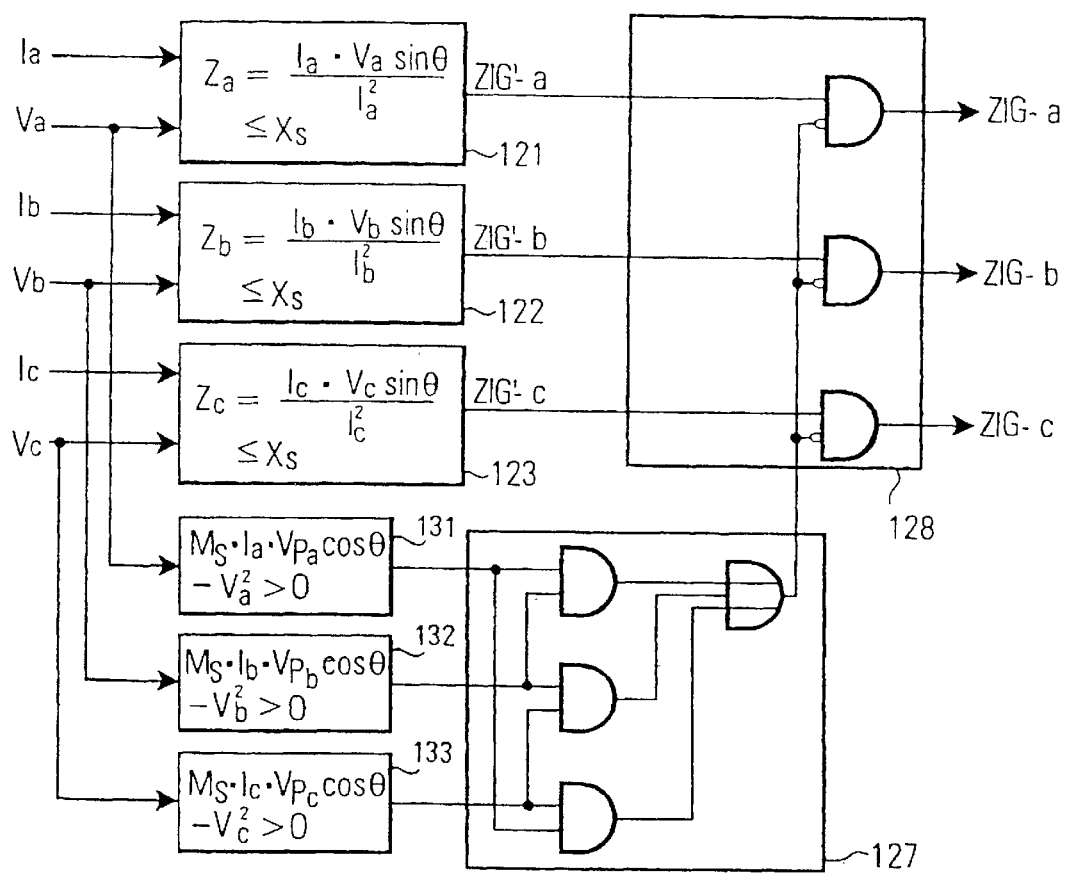
FIG. 12 is a functional block diagram showing a fifth embodiment of a distance relay in connection with this invention.

FIG. 12 is a functional block diagram illustrating a fifth embodiment of a distance relay in connection with the invention. Some parts which are the same as in FIG. 10 are given the same reference symbols and further description is omitted, only the points of differences being discussed.

In FIG. 12, the points of differences from FIG. 10 are that, instead of the UV element judging units 124 to 126, operation judging is respectively performed in respect of mho relay (Z3G) elements (mho characteristic), and the Z3G element judging units 131 to 133 are provided that are employed as third-stage zone outputs. In the Z3G element judging units 131 to 133, "Ms" means a setting value of an mho relay element. This setting value is equal to a diameter of a circle of the mho relay element. This definition applies to a FIG. 14 mentioned later.

When the operation judging signal of these Z3G element judging units 131 to 133 is input to output control unit 127, this output control unit 127 identifies whether a single-phase fault or a fault involving two or more phases is in question and takes the output of the ZIG element as valid only in the event of single-phase operation of the Z3G element.

This means that an extra relay element for output control of the ZIG element is unnecessary and this can be implemented by simple processing using only the first stage to the third stage elements constituted as an ordinary ground fault distance relay. The same action and benefits as in the case of the fourth embodiment can be obtained with this construction also.

In the embodiments described above, a calculation system is described in which the impedance component is directly calculated in the operation judging of the distance relay.

However, judging could be performed by equivalently replacing the impedance by a voltage by converting from the current and a setting value to a voltage.

Figure 13:
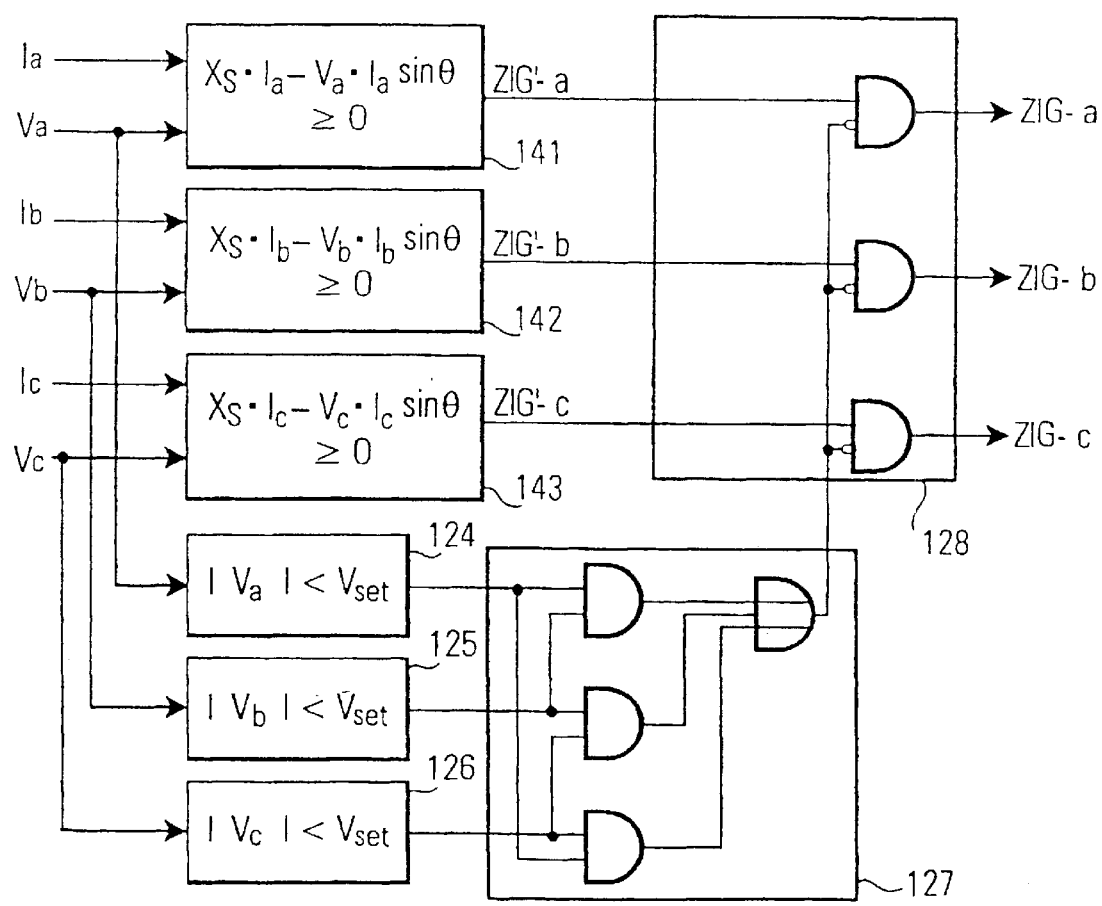
FIG. 13 is a functional block diagram of a sixth embodiment of a distance relay according to the invention.
Figure 14:
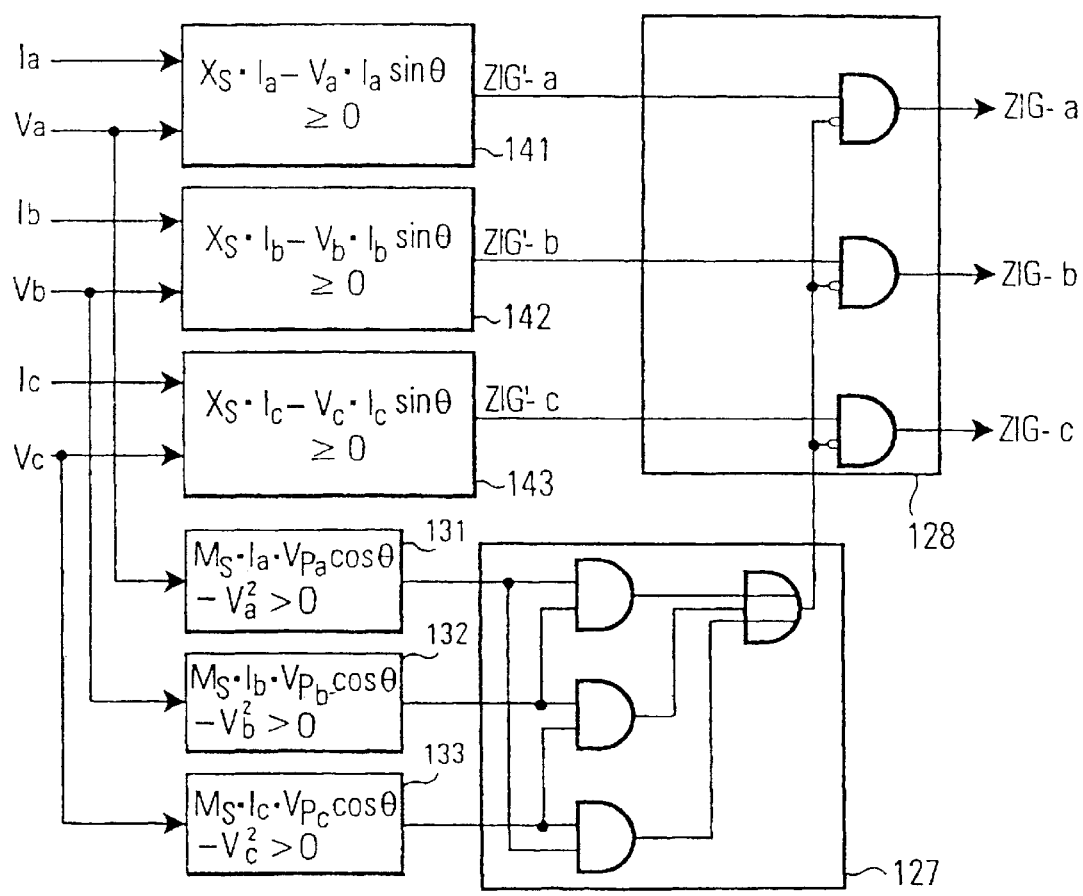
FIG. 14 is a functional block diagram of a sixth embodiment of a distance relay in connection with the invention.
Figure 15:
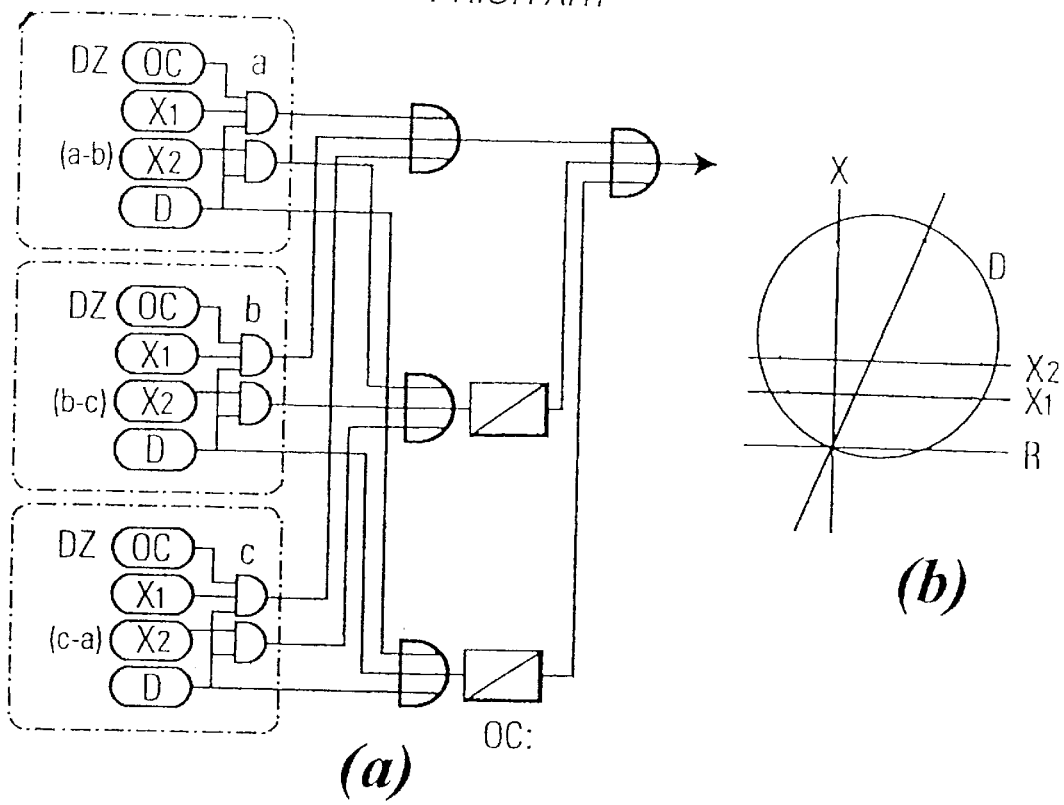
FIGS. 15, 16 shows prior art examples.
Figure 16:
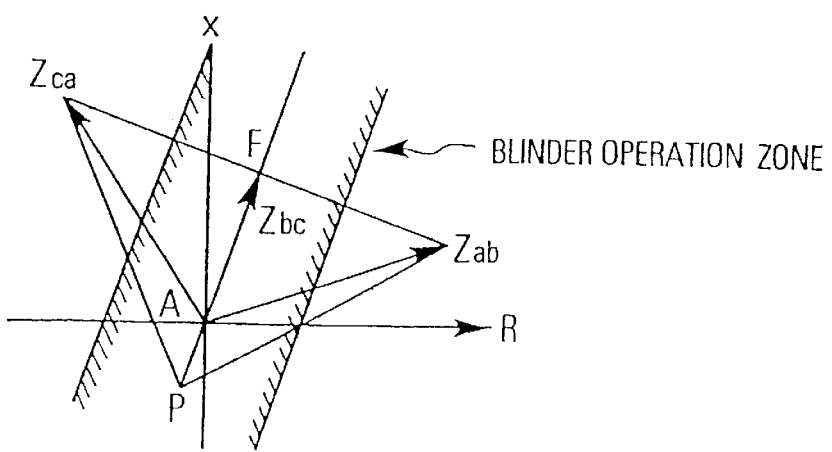

FIG. 13 and FIG. 14, respectively, show functional block diagrams of sixth and seventh distance relays in connection with this invention, in which such a judging system is adopted. The differences between FIG. 13 and FIG. 14 from FIG. 10 and FIG. 12, respectively, are that, as a ZIG element operation judging units 141 to 143, conversion is effected to a voltage amount by multiplying the current by a set impedance and the phase difference or absolute value difference with respect to the introduced voltage is taken as the operation quantity, employing a minimum phase voltage selection condition as restricting quantity.

The same benefits as in the fourth and fifth embodiments are of course thereby obtained. With the inventions described above, a minimum phase voltage condition is added to the operation judging of the short-circuit distance relay, or a single-phase operation judging of the short-circuit distance relay, or a single-phase operation condition of the UV elements or Z3G elements is added to a ground fault distance relay so unwanted operation due to over-reach of a sound phase element can be prevented, making it possible to operate stable operation correctly responding to the faulted phase only.

The entire contents of JAPANESE PRIORITY APPLICATION NUMBER P10-291967, filed on Oct. 14, 1998, on which the content and claim for priority of the instant application are based, are hereby incorporated by reference.

Obviously, numerous modifications and variations of the present invention are possible in light of the above teachings. It is therefore to be understood that within the scope of the appended claims, the invention maybe practiced otherwise than as specifically described herein.

What is claimed is:

1. A distance relay equipment for detecting a protective region having a fault, among a protective zone that includes a plurality of protective regions, based on a status of a power system, comprising:

an operation decision unit having short-circuit fault distance relay elements that input respectively an electrical quantity from an AC power system of three phases a, b and c, the operation decision unit calculating a fault impedance from each of the electrical quantity to compare said fault impedance, which correspond to ab-phase, bc-phase and ca-phase, with a set impedance, to produce a judging signal of each ZIS (zone first for phase fault) element (ZIS element-ab, ZIS element-bc and ZIS element-ca), depending on said result of said comparison;

a calculating unit for calculating a phase-to-phase voltage amplitudes($|Vab|$, $|Vbc|$, $|Vca|$) in said ab-phase, bc-phase and ca-phase;

a minimum phase voltage selection unit for selecting a minimum voltage phase ($V_A$min) for the phase-to-phase voltage amplitudes($|Vab|$, $|Vbc|$, $|Vca|$) determined by said calculating unit;

a fault phase element output unit for having an AND function, which is set to each of the phases (ab-phase, bc-phase, ca-phase) of said minimum voltage phase ($V_A$min) selected by said minimum phase voltage selection unit and said judging signal (ZIS element-ab, ZIS element-bc and ZIS element-ca), and outputs an operation signal, to separate, the protective region having the fault, from the protective zone, of said ZIS element-ab, said ZIS element-bc and said ZIS element-ca, if said AND condition is satisfied; and an operation output unit for judging whether or not two or more operated phases of the ZIS elements are present, to output an operation signal of said ZIS elements to separate the protective region having the fault from the other protective zones.

2. A distance relay equipment according to claim 1, wherein said minimum phase voltage selection unit comprises:

a first unit for determining a first value equal to the absolute value of the difference between the absolute value of a first phase voltage and the absolute value of a second phase voltage;

a second unit for determining a second value equal to the absolute value of the difference between the absolute value of a first phase voltage and the absolute value of a third phase voltage;

a selection unit for selecting the first phase voltage if
i) the first and second values are greater than a predetermined threshold,
ii) the absolute value of the difference between the absolute value of the third phase voltage and the absolute value of the second phase voltage is less than the predetermined threshold, and
iii) the difference between the absolute value of the third phase voltage and the absolute value of the first phase voltage is greater than the predetermined threshold;

the selection unit selecting the second phase voltage if
i) the first value is greater than the predetermined threshold,
ii) the second value is less than the predetermined threshold, and
iii) the difference between the absolute value of the first phase voltage and the absolute value of the second phase voltage is greater than the predetermined threshold; and the selection unit selecting the second phase voltage if
i) the first value is less than the predetermined threshold,
ii) the second value is greater than the predetermined threshold, and
iii) the difference between the absolute value of the first phase voltage and the absolute value of the third phase voltage is greater than the predetermined threshold.

3. A distance relay equipment according to claim 2, further comprising:

a third unit for selecting the minimum voltage phase among said first phase voltage, said second phase voltage and said third phase voltage if said selection unit does not select one of the phase voltages.

4. A distance relay equipment according to claim 2 wherein said predetermined threshold is about 0.05 pu.

5. A distance relay equipment according to claim 1 wherein said operation decision unit output a judging signal if followings equations are satisfied:

$$(Iab-Vab \cdot \sin \theta)/I^2 ab \geq Xs;$$

$$(Ibc-Vbc \cdot \sin \theta)/I^2 bc \geq Xs; \text{ and}$$

$$(Ica-Vca \cdot \sin \theta)/I^2 ca \geq Xs;$$

where Iab, Ibc and Ica are a phase-to-phase current;
where Vab, Vbc and Vca are a phase-to-phase voltage; and
where Xs is a setting impedance.

6. A distance relay equipment according to claim 1 wherein said operation decision unit outputs a judging signal if the followings equations are satisfied:

$$Xs \cdot Iab-Vab \cdot Iab \cdot \sin \theta \geq 0;$$

$$Xs \cdot Ibc-Vbc \cdot Ibc \cdot \sin \theta \geq 0;$$

$$Xs \cdot Ica-Vca \cdot Ica \cdot \sin \theta \geq 0;$$

where Iab, Ibc and Ica are a phase-to-phase current;
where Vab, Vbc and Vca are a phase-to-phase voltage; and
where Xs is a setting impedance.

7. A distance relay equipment according to claim 6, wherein said calculating unit includes a mho relay element.

8. A distance relay equipment according to claim 7, wherein said calculating unit uses the following equations of said mho relay element:

$$Ms \cdot Ia \cdot Vpa \cdot \cos \theta - Vb^2 > 0;$$

$$Ms \cdot Ib \cdot Vpb \cdot \cos \theta - Vc^2 > 0;$$

$$Ms \cdot Ic \cdot Vpc \cdot \cos \theta - Va^2 22 \; 0;$$

where Ms is a setting value of an mho element;
where Ia, Ib and Ic is a phase current; and
where Vp is a polarity voltage.

9. A distance relay equipment according to claim 7 wherein said operation decision unit outputs a judging signal if the followings equations are satisfied:

$$(Ia \cdot Va \cdot \sin \theta)/I^2 a \leq Xs;$$

$$(Ib \cdot Vb \cdot \sin \theta)/I^2 b \geq Xs; \text{ and}$$

$$(Ic \cdot Vc \cdot \sin \theta)/I^2 c \geq Xs;$$

where Ia, Ib and Ic are a phase current;
where Va, Vb and Vc are a phase voltage; and
where Xs is a setting impedance.

10. A distance relay equipment according to claim 7 wherein said operation decision unit outputs a judging signal if the followings equations are satisfied:

$$Xs \cdot Ia-Va \cdot Ia \cdot \sin \theta \geq 0;$$

$$Xs \cdot Ib-Vb \cdot Ib \cdot \sin \theta \geq 0; \text{ and}$$

$$Xs \cdot Ic-Vc \cdot Ic \cdot \sin \theta \geq 0;$$

where Ia, Ib and Ic are a phase current;

where Va, Vb and Vc are a phase voltage; and where Xs is a setting impedance.

11. A distance relay equipment, for detecting a protective region having a fault, among a protective zone that includes a plurality of protective regions, based on status of a power system, comprising:

an operation decision unit having ground fault distance relay elements that input respectively an electrical quantity from an AC power system of three phases a, b and c, calculating a fault impedance from each electrical quantity and compare said fault impedance with a set impedance and that, making a judging signal of each ZIG (zone first for earth fault) element (ZIG element-a, ZIG element-b and ZIG element-c), depending on said result of said comparison;

a calculating unit having an under-voltage relay element, outputting a judging signal if an absolute value of each phase voltage (|Va|, |Vb|, |Vc|) is larger than a prefixed value;

an output unit identifying whether or not said judging signal outputted from said calculating unit is present for two or more phases;

a final output unit, if said judging signal is present for two or more phases in said output unit, performing an output of an operation signal, to separate a protective region having fault from the protective zone, of all of said judging signal of said operation decision unit to a non-operated side.

* * * * *